United States Patent [19]

O'Rell et al.

[11] 4,369,236
[45] Jan. 18, 1983

[54] BATTERY SEPARATOR

[75] Inventors: Dennis D. O'Rell, Boxborough; Wai M. Choi, West Newton; Nan J. Lin, Burlington, all of Mass.

[73] Assignee: W. R. Grace & Co., New York, N.Y.

[21] Appl. No.: 240,402

[22] Filed: Mar. 4, 1981

[51] Int. Cl.³ .................................. H01M 2/18
[52] U.S. Cl. ............................. 429/147; 429/253; 429/254
[58] Field of Search ............... 429/147, 146, 251, 253, 429/254, 247, 81

[56] References Cited

U.S. PATENT DOCUMENTS

| | | | |
|---|---|---|---|
| 729,100 | 5/1903 | Sperry | 429/147 |
| 2,465,493 | 3/1949 | Strickhouser et al. | 429/147 |
| 2,579,589 | 12/1951 | Lehmberg | 429/147 |
| 2,662,106 | 12/1953 | Uhlig et al. | 429/147 |
| 2,850,559 | 9/1958 | Stickel | 429/147 |
| 3,272,656 | 9/1966 | Corbin et al. | 429/147 |
| 3,551,362 | 12/1970 | Decker | 429/253 X |
| 3,918,995 | 11/1975 | Palmer et al. | 429/147 |
| 4,205,123 | 5/1980 | Palmer et al. | 429/147 |
| 4,228,225 | 10/1980 | O'Rell et al. | 429/147 |

*Primary Examiner*—Anthony Skapars
*Attorney, Agent, or Firm*—Howard J. Troffkin

[57] ABSTRACT

The instant invention is directed to a sheet product capable of forming an improved battery separator. The present sheet product is formed from a thin, acid-stable, porous material and has a first and a second major face with a plurality of separate, continuous, open channels on each major face such that each channel on each major face defines a separation between two channels on the other major face. Further, each channel defines an imaginary median line with at least some portions of at least some channels extending laterally with respect to the imaginary median line and each channel has at least one continuous contour line in the form of straight line segments such that every portion of each channel is capable of being at an acute angle of not greater than 70 degrees from an imaginary vertical line orientated from bottom to top of a battery containing the sheet product.

16 Claims, 10 Drawing Figures

BATTERY SEPARATOR

BACKGROUND OF THE INVENTION

The present invention is directed to an acid-stable porous sheet product which has a structural configuration suitable for forming an improved battery separator, to an improved battery separator formed from said separate sheet product and to a battery, in particular to a lead-acid battery, which has the present improved separator located between adjacent plates of opposite polarity.

Storage batteries have been known and used for over a century. A conventional storage battery is formed of one or more units or cells, each of which has a positive electrode, a negative electrode, separator elements between electrodes of opposite polarity and an electrolyte, such as aqueous sulfuric acid.

Separators for a lead-acid battery should prevent contact between electrodes of opposite polarity yet permit contact between electrode and excess electrolyte to produce efficient electrochemical reactions. For example, electrodes formed from lead and lead oxide must be maintained in contact with an excess of sulfuric acid electrolyte solution to permit the double sulfate reaction to occur between the electrode's material and the acid during discharge while also providing sufficient ionic strength electrolyte for ion transfer. Further, separators should permit the removal of gaseous products which are formed on the plate surfaces during the charging operation of any charge/discharge cycle. Oxygen is normally formed and evolved at the positive plates and hydrogen at the negative plates. The gaseous products are generally in the form of minute bubbles and may form at any point on an electrode plate surface. These bubbles are impediments to electrolyte/electrode contact required to have efficient battery operation.

In early battery designs, where compactness and energy density were not a prime objective, electrode elements of opposite polarity were maintained sufficiently apart by separator pins or posts which readily allowed the flow of electrolyte and egress of formed gaseous products.

In a modern storage battery, a group of interconnected plates forming the positive electrode is intermeshed with another group of interconnected plates which act as the negative electrode to give alternating positive/negative plate orientation within each cell of the battery. Each plate must be maintained apart from adjacent plates of opposite polarity by some form of separation means. Contact may be due to imperfections in plate structure or due to warping or wrinkling of the plate which may occur during assembly or during normal operation of the battery as well as by other chemical or physcial phenomena. The desire to develop batteries of compact, high specific capacity (electrical energy/unit weight) in which the separator membranes are sandwiched between electrodes of opposite polarity requires a separator which is capable of being formed from thin, light weight sheet material; providing means for the removal of gases; providing for electrode/electrolyte contact within a minimum spacing; and exhibiting the ability to withstand the compressive forces encountered from adjacent electrode plates. Such forces tend to distort and sometimes permanently collapse the gaseous egress means designed in some coventional separators. The separator component is recognised as a key element in forming a highly efficient battery.

Prior art separators used in lead-acid storage batteries have included various designs which provide spacer arrangements such as separators which are laminated with glass mat or which have ribs or projections formed on at least one major surface. Such separators are costly to form and add material and weight to the battery system. Further, separators which have glass mats as part of their structure have the defect of permitting gas bubbles to be lodged and retained within the mat's fiberous structure. Useful ribbed separators have heretofore only been formed from thick sheet stock since thin sheet materials have been found too flexible to permit effective alignment of the separator between adjacent electrode plates of opposite polarity.

Separators with spacing arrangements have also been formed from embossed sheet products. Embossment of various designs are known and include straight corrugated configurations, such as described in U.S. Pat. No. 2,662,106, or projections, as described in U.S. Pat. Nos. 2,382,829; 2,465,493; 4,072,802; and 4,153,759. The known corrugated type of separator does not have structural integrity when formed from thin sheet stock. Thin corrugated separators have the defect of succumbing to the compressive forces and collapsing against a plate surface. Separators of straight corrugated design are suitable for gas release only when formed from rigid and thicker than desired stock. Separators having embossed separate projections, such as shown in U.S. Pat. Nos. 2,382,829 and 2,465,493, tend to trap gaseous products in their individual cavities. Separators such as shown in U.S. Pat. Nos. 4,072,802 and 4,153,759, are capable of being formed from thin sheet stock, but have conical projections which tends to block the egress of gaseous products. U.S. Pat. No. 4,228,225, is directed to a separator capable of being formed from thin sheet material and provides an embossed configuration having continuous vertically orientated gas egress paths. The egress paths of the separator described in '225 have constricted areas which may retard the removal of gas from the battery. The presently described sheet product enhances and promotes the removal of formed gaseous products by a design which forms non-constricted egress paths while providing the other desired properties.

An object of the present invention is to provide a sheet product suitable for use as a battery separator.

A further object of the present invention is to provide a thin sheet product suitable as a battery separator which has paths on both sides of the battery separator to provide for and enhance the removal of gaseous products formed within the battery.

A further object of the present invention is to provide a thin sheet product suitable for use as a battery separator which provides means for enhancing the removal of gaseous products while also providing substantial electrolyte to electrode contact to form an effective battery.

A still further object of the present invention is to provide a thin sheet product suitable for use as a battery separator which has means to provide for and enhance the removal of gaseous products, to provide for good electrolyte to electrode contact and to have sufficient resistance to mechanical forces encountered to maintain its configuration during use.

A still further objective of the present invention is to provide a thin porous sheet product suitable for use as a battery separator wherein the sheet has a first and a second major face with each face containing a plurality of separate continuous open channels such that each channel on one face defines a separation between two channels on the other face, and that some of the channels have a configuration which has some degree of lateral extension beyond a minimum lateral extension of the channel with respect to an imaginary median line for that channel, every channel has at least one continuous channel defining contour line formed from straight line segments and substantially every portion of each channel defining contour line is oriented at an acute angle of no greater than 70 degrees from the vertical.

Another object of the present invention is to provide a porous sheet which has substantially uniform thickness throughout; having a configuration which provides improved gaseous egress means on both major surfaces and which can be formed into a wrap-around or enveloping configuration while maintaining the same improved gaseous egress means in said wrap-around or U configuration.

Another object of the subject invention is to provide a sheet product suitable for use as a battery separator wherein the sheet has a first and a second major face with each major face containing a plurality of separate continuous open channels such that each channel on each face has a configuration which has some degree of lateral extension beyond a minimum lateral extension with respect to an imaginary median line for the channel, every channel has at least one continuous channel defining contour line formed from straight line segments such that substantially every portion of each channel defining contour line as viewed on the face is orientated at an acute angle of no greater than 70 degrees from the vertical.

A further object of the present invention is to provide an acid-stable porous battery separator from a sheet product of this invention.

A further object of the present invention is to provide an acid battery having a container, an electrolyte at least one pair of electrode plates of opposite polarity and a separator formed from a sheet product of this invention positioned between and at least coextensive with each pair of electrode plates.

DETAILED DESCRIPTION OF PREFERRED EMBODIMENTS

The present invention is directed to sheet products useful as a battery separator. The subject sheet product has a structural configuration which provides continuous and enabling egress paths for the removal of gaseous products from a battery, provides a means of permitting good electrolyte/electrode contact while at the same time providing structural strength to resist compressive forces even when the sheet product is formed from thin stock material. The separator of the present invention can be formed from a microporous sheet product and can be formed into individual substantially planar sheets or wrap-around U shape design while providing the continuous upward egress paths on all major surfaces of the separator.

Figure 1:
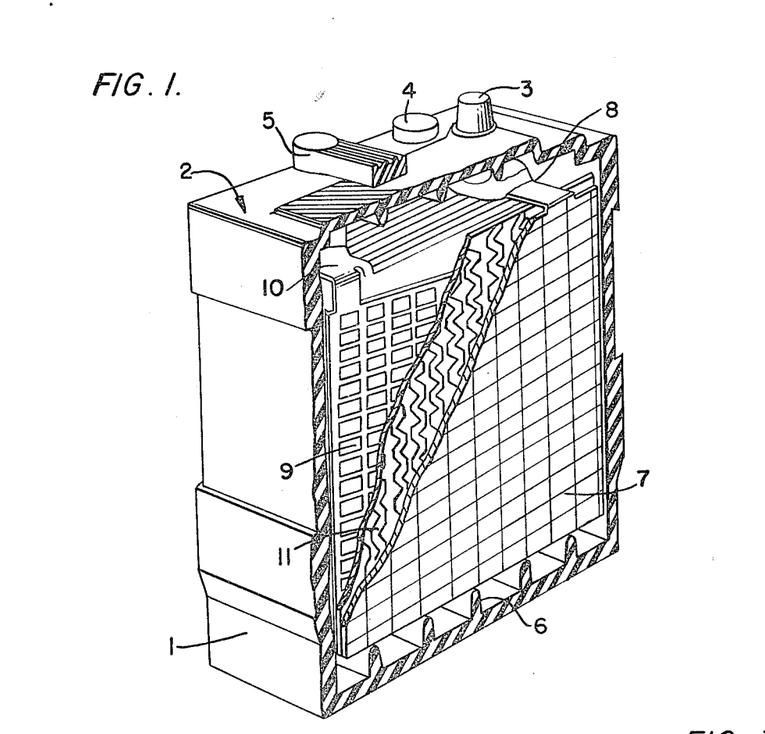
FIG. 1 is a cut-away view of a storage battery cell containing a separator membrane located between a positive and a negative electrode plate.
Figure 9:
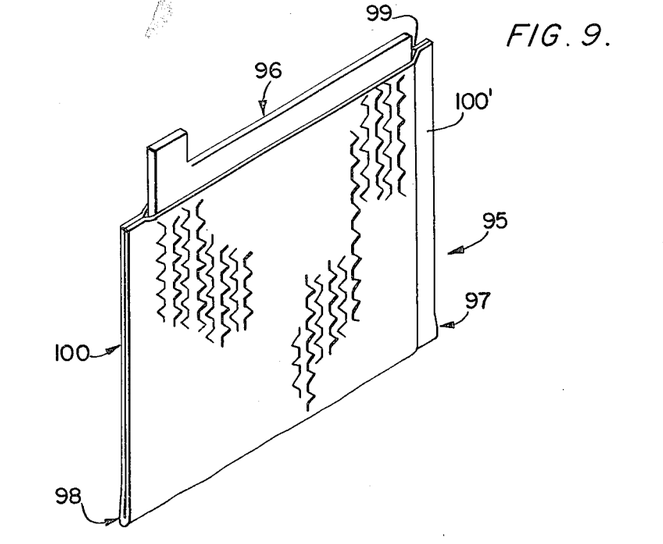
FIG. 9 is a perspective view of a single envelope-shaped separator formed from a sheet product of the present invention which has an electrode plate contained therein.

FIG. 1 illustrates a cell of a storage battery, such as a conventional lead-acid automotive type battery, formed from outer container 1 and cover 2 with its associated terminal post 3, vent plug 4 and inter cell connector 5. The bottom of container 1 normally has means 6, such as ribs, to support an electrode assembly. The assembly is made up of a negative electrode formed from a number of negative electrode plates 7 which are spaced from one another and connected by a negative connecting strap 8, and a positive electrode formed by a number of positive electrode plates 9 which are spaced from one another and connected by a positive connecting strap 10. The negative plates 7 are positioned in the space between each of two positive plates 9 to form an alternating sequence of negative-positive plates. Between each pair of plates of opposite polarity of the electrode assembly is separator 11 to prevent contact between the plates. The separator of the present invention can be used as individual sheet products between each pair of plates of opposite polarity as shown in FIG. 1 or can be wrapped around each of the positive or each of the negative plates such as in an open sided U configuration (edges of the separator sheet adjacent to the vertical size of battery container 1) or a closed sided, known in the art as an "envelope", configuration as shown in FIG. 9 described in detail hereinbelow.

Figure 2:
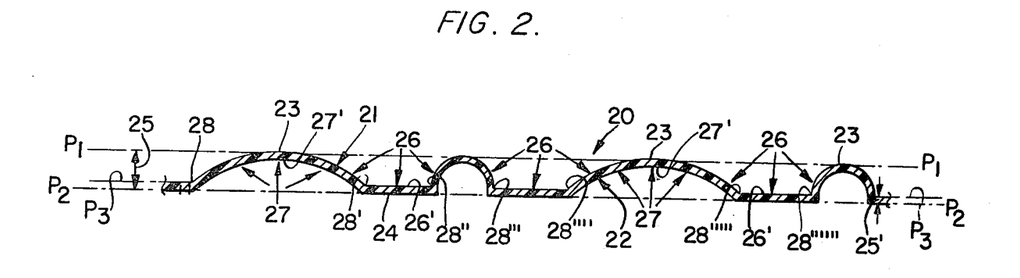
FIG. 2 is a cross-sectional view of a portion of a sheet product of the present invention along intersect line 2—2 of FIG. 3.
Figure 3:
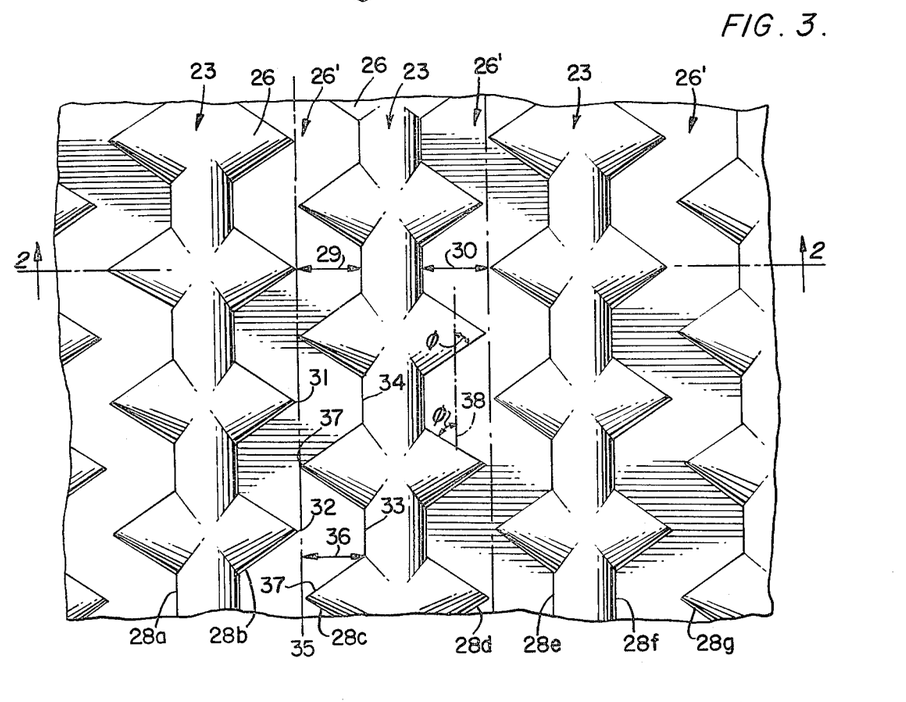
FIG. 3 is a facial view of a portion of one major face of a sheet product according to one embodiment of the present invention.

FIGS. 2 and 3 are described herein for purposes of identifying certain terms used throughout this specification and in the appended claims as well as to describe a preferred embodiment of the instant invention. FIG. 2 is an enlarged cross-sectional view at intersect line 2—2 of a portion of a sheet product of FIG. 3 according to the present invention. FIG. 3 is a planar view of face 21 of FIG. 2.

FIG. 2 represents a partial and enlarged cross-sectional view of a sheet product 20 which has a first major face 21 and a second major face 22. Major faces 21 and 22 of sheet 20 are contained within imaginary boundary planes $P_1$—$P_1$ and $P_2$—$P_2$, and the spacial relationship between planes $P_1$—$P_1$ and $P_2$—$P_2$ defines distance 25, which is the maximum spacial distance of sheet product 20. The sheet product 20 has a body thickness 25' between surfaces 21 and 22 which is generally of substantially thin uniform dimension throughout sheet 20.

Each of the major faces of the sheet 20 is in the form of a surface which has a multiplicity of extensions from its boundary plane towards the other boundary plane. Specifically, major face 21 is in the form of a surface which has apex portions 23 which are in closest spacial relationship to boundary plane $P_1—P_1$ relative to surface areas of face 21 which are adjacent to any one portion 23. Each apex portion 23 is generally contiguous with boundary plane $P_1—P_1$. Major face 21 has extended surface areas 26 which do not lie in plane $P_1—P_1$ but extend in the direction towards plane $P_2—P_2$ within the maximum spacial distance 25. Each extended surface area 26 is normally (with the possible exception of one which is adjacent to an edge of the sheet product) bound by spaced, adjacent apex portions 23 of face 21 and, therefore, each of such surface areas 26 forms an open channel on major face 21. Each portion of surface area 26 of face 21 which is bound by two adjacent apex portions 23 has a nadir portion 26' which is the portion of surface area 26 extending closest to boundary plane $P_2—P_2$. The terms "raised surface area" and "depressed surface area", as used in this description and the appended claims, are relative terms which define points on a surface of a sheet product of the present invention with respect to another point on the same surface and within the bounds of two adjacent apex points on that surface as viewed from a cross-sectional configuration with the surface apex points being positioned upwardly.

Similarly, face 22 forms a surface which has a multiplicity of apex portions 24 (in the form of areas and/or points) which are in closest spacial relationship to boundary plane $P_2—P_2$ relative to surface areas of face 22 adjacent to any one apex portion 24. Major face 22 has extended surface areas 27 which extend from apex portions 24 toward plane $P_1—P_1$ within distance 25. Each extended surface area 27 is normally (with the possible exception of one which is adjacent to an edge of the sheet product) bound by spaced, adjacent apex portions 24 of face 22 which are closest to plane $P_2—P_2$ and, therefore, each of such extended surface areas 27 forms an open channel on major face 22. Each portion of surface area 27 forming a separate open channel bound by two adjacent apex portions 24 has a nadir portion 27' which is a portion of surface 27 extending closest to boundary plane $P_1—P_1$. It can be seen that each open channel forming extended surface area 26 on face 21 has a corresponding apex surface area 24 on face 22 which separates two adjacent open channels 27 of face 22 and vice versa. Specifically, each nadir portion 26' of each channel surface area 26 corresponds to apex portions 24 on face 22 and each nadir portion 27' of each channel surface area 27 corresponds to apex portions 23 on face 21. The channels on one major face form a separation between two adjacent channels on the other major face.

Each apex portion and each nadir portion on a major face of the sheet product can be in the form of either a planar area or a line extending on the surface of the sheet product. Each channel on each face of the sheet product has at least one apex portion adjacent thereto which is of a substantially planar configuration and/or has a nadir portion which is of a substantially planar configuration. With respect to sheet product 20, imaginary plane $P_3—P_3$ is a plane lying within spacial distance 25 of planes $P_1—P_1$ and plane $P_2—P_2$. Plane $P_3—P_3$ is substantially contiguous with planar nadir portions 26' and intersects extended surface areas 26 at points 28, 28', 28'', 28''', 28'''' and 28''''' which are each the points of intersection between extended surface areas 26 and respective nadir planar surface areas 26'.

FIG. 3 is a planar view of face 21 of sheet 20. Face 21 has apex portions 23 which extend continuously along the surface area of face 21. Each apex portion 23 is spacially separated from an adjacent apex portion by a nadir planar portion 26' and extended surface areas 26 extending from the nadir planar portion 26' to two adjacent apex portions 23. Each apex portion 23 may be in the form of a substantially straight continuous line. Each extended surface area 26 is a continuous curved surface which intersects the nadir planar portion 26' at intersect lines 28a, 28b, 28c, 28d, 28e, 28f and 28g which are each the facial extension lines on face 21 of points 28, 28', 28'', 28''', 28'''', 28''''' and 28'''''', respectively, as depicted in FIG. 2 above. The line of intersection formed by any extended surface area 26 with a planar apex portion and/or a planar nadir portion defines the channel configuration to which the planar area is associated. Each intersect line is a continuous line substantially in the form of straight line segments. It is understood that the intersection between segments forming any one intersect contour line may be curved to reduce stress and possible rupture of the sheet during processing or during its use as a battery separator.

The pattern of every channel is defined by the planar nadir and/or planar apex portions. For example, referring to FIG. 2 nadir area 27' is not a planar area yet the channel formed by extended surface 27 is defined by the contour line formed with the aid of adjacent planar area 24. Even if a channel does not contain a planar nadir area, the channel's pattern is defined by the planar area adjacent to the channel. Referring again to FIG. 3, intersect contour lines 28b and 28c define a nadir planar area 26' which has a spaced dimension 29 between points 28' and 28'' on face 21 of FIG. 2. Similarly, distance 30 between intersect contour lines 28d and 28e represents the dimensional width of nadir portion 26' on face 21 between points 28''' and 28'''' of FIG. 2. The pattern bounded by the intersect contour line 28b between points 31 and 32 and by contour line 28c between points 33 and 34 represents a single cycle of a pattern which again repeats itself along at least a segment of the channel's extension. Line 35 is an imaginary median line of channel 26 such that over any one cycle of channel's pattern the median line 35 is straight and bisects the total area 31, 32, 33, 34 of the channel into equal average (arithmetic mean) areas. Imaginary median line can be curved or straight over the total extent of the sheet products. Channel 26 has, as a part of its pattern, extensions 36 which extend laterally from the median line to a greater distance that the minimum dimension 37 of the channels lateral extension. At least some portions of at least some of the channels of the sheet product should have lateral extensions which are greater than the minimum lateral extension of the channel. It is preferred that at least some portions of each of the channels have lateral extensions greater than the channel's minimum lateral extension. It is realized that the minimum lateral extension 37 of a channel can be substantially zero, i.e., where the contour line touches the imaginary median line, or can be a negative dimension when measured from the median line back to the contour line, i.e., where the contour line projects across the imaginary median line. A sheet product in which all of the channels have all lateral extensions equidistant from an imaginary median line does not exhibit the desired properties which are unexpectedly attained by the sheet product of the present invention.

Each of the intersect contour lines of any one channel on face 21 of sheet 20 must have all sections capable of being at an acute angle of not greater than 70 degrees and preferably not greater than about 50 degrees relative to a vertical orientation line with respect to top to bottom orientation of a battery in which it is contained. For example, line 28d is an intersecting contour line between nadir portion 26' and extended surface area 26 on face 21. The sheet product 20 of FIG. 3 is capable of being oriented such that when line 38 representing an imaginary vertical orientation line of the sheet product from bottom to top of a battery in normal use orientation in which the sheet product is contained the angle theta ($\phi$) is an acute angle formed by the imaginary vertical line 38 and contour line 28d at the points of intersection. A preferred configuration of sheet product 20 will have imaginary median lines 35 of at least some of its channels in the form of straight lines, and the imaginary median lines 35 are substantially vertically orientated when the sheet product 20 is contained in a battery.

Figure 4:
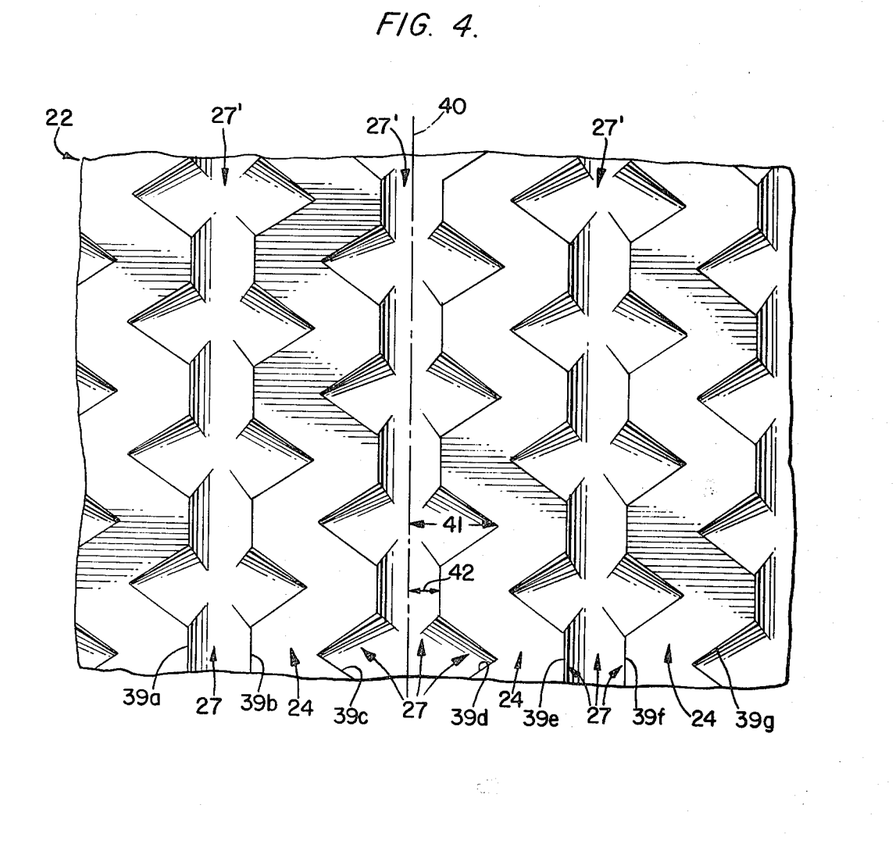
FIG. 4 is a facial view of a portion of the second major face of the sheet product of FIG. 3.

FIG. 4 is a planar view of face 22 of sheet product 20. Sheet product 20 has a body dimension 25' which is substantially uniform throughout the extent of the sheet material and, therefore, face 22 has a substantially reverse configuration with respect to that of face 21. Surface 22 has a multiplicity of apex surface portion 24 which continuously extends along sheet 22. Each apex surface portion 24 is spaced apart from adjacent apex surface portions 24 by nadir portion 27' and extended surface areas 27 extending from nadir portion 27' to apex portions 24. The intersection of extended surface area 27 with apex surface portion 24 forms intersect contour lines 39a, 39b, 39c, 39d, 39e, 39f and 39g. Each intersect line 39 is formed of straight line segments.

Each nadir portion 27' is substantially in the form of a straight line extending the length of channel 27. Each apex portion 24 is a substantially planar portion defined by a pair of intersect contour lines. For example, intersect contour lines 39b and 39c are in spaced relationship to one another and define a substantially planar surface area of face 22 which is contiguous with or most extended towards the boundary plane P$_2$—P$_2$ of face 22 with respect to adjacent surface areas as defined in FIG. 2. Each of the straight line segments forming any one of intersect contour lines 39 must be capable of being at an acute angle of up to 70 degrees and preferably up to about 50 degrees from an imaginary vertical orientation line with respect to the top to bottom orientation of a battery in which sheet 20 is contained. The value of the acute angles for each of the intersect contour lines of face 22 will be substantially the same as that of the complimentary intersect contour lines on surface 21.

The nadir line 27' and its associated extended surface areas 27 are depressed surface areas with respect to adjacent apex surface portions 24 and form a continuous, open channel on face 22. Each channel has an imaginary median line 40 which bisects the average area of the channel in the same manner as described above for channels on face 21. The median line 40 can be straight or curved. It is preferably in the form of straight lines. At least some portions of some of the channels 27, as per face 21, have lateral extensions 41 which are greater than the minimum lateral extension 24 of that channel.

The channels on each of the faces of a sheet product of the present invention must be in the form of an open, continuous channel. The terms "open" and "continuous" are separate and distinct terms, not meant to modify each other. The term "open" is meant in the instant specification and in the appended claims to define a channel which opens out from the face of the sheet product. The term "continuous" is meant herein and in the appended claims to define a continuous, non-segmented channel from one end to the other capable of having a continuous rising configuration when in use position. The continuous segmented straight line configuration of the intersect contour lines defining each of the channels aids and causes any gaseous product to be readily removed from the battery system while, simultaneously, providing substantial electrolyte/electrode contact; resisting compressive forces exerted on the major faces of the formed sheet product; and providing, when properly oriented within a battery as described hereinbelow, an improved gas egress means.

If the imaginary median lines of the channels are each straight lines which are substantially parallel to vertical orientation lines of a battery in which the sheet product is contained some of the straight line segments are oriented substantially parallel to the vertical orientation line (acute angle theta is substantially zero) while each of the other straight line segments forming an intersect contour line can be oriented at an acute angle of substantially a single value which is greater than zero yet less than 70 degrees.

Figure 5:
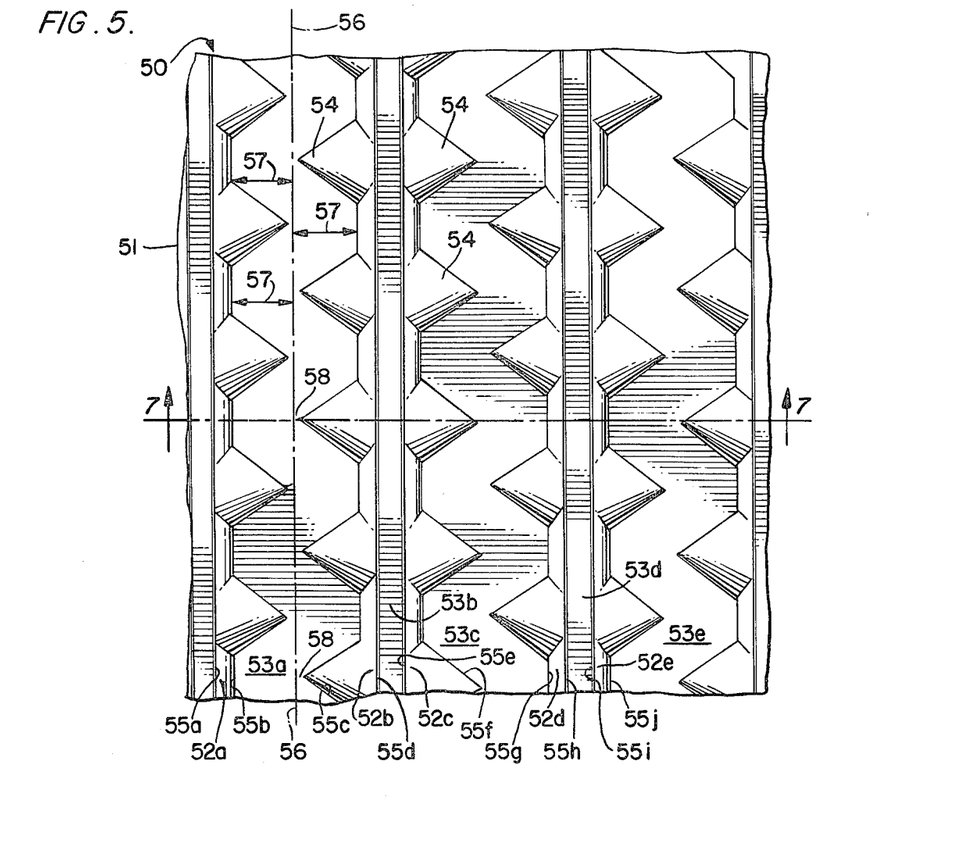
FIG. 5 is a planar view of a portion of a first major face of a sheet product according to one embodiment of the present invention.

FIG. 5 is a planar view of a portion of one face 51 of sheet product 50 illustrating another preferred specie of the instant invention. Sheet product 50 has open continuous channels on each of its faces of which some of the channels are defined by continuous intersect contour lines formed from segmented straight lines and some of the channels are defined by continuous intersect contour lines which are each a single substantially straight line segment. Specifically, face 51 has a multiplicity of apex portions 52 which are individually labeled 52a, 52b, 52c, 52d and 52e. Each apex portion is continuous and in spaced relationship to the other. Face 51 also has a multiplicity of nadir portions 53 which are individually labeled 53a, 53b, 53c, 53d and 53e. Each apex portion 52 is connected to adjacent nadir planar areas 53 by extended surface area 54 which is in the form of a generally curved or sloping surface of face 51. The intersection of each nadir planar area 53 with adjacent extended surface areas 54 forms intersect contour lines 55 which define each channel on face 51. Intersect contour lines 55 are individually labeled 55a, 55b, 55c, 55d, 55e, 55f, 55g, 55h, 55i and 55j. It can be readily seen, for example, that the channel defined by nadir planar area 53a contains continuous intersect contour lines 55b and 55c which bound nadir portion 53a. Lines 55b and 55c are each formed of continuous segmented straight line sections. An imaginary median line 56 bisecting the average area of channel 53a aids in defining the intersect contour lines as having lateral extensions 57 which are greater than the minimum lateral extensions 58 of each intersect contour line with respect to the median line 56. A channel defined by nadir portion 53b contains continuous intersect contour lines 55d and 55e which bound nadir portion 53b. Each of the intersect contour lines 55d and 55e is formed by the intersect between nadir portion 53b and the adjacent extended surface areas 54 which extend from apex portions 52b and 52c, respectively, to nadir portion 53b. Intersect contour lines 55d and 55e are each of a substantially straight line configuration. Channels 53c and 53d are of a similar overall configuration to that of 53a and 53b, respectively. Each of the channels is defined by a pair of intersect contour lines (between apex planar area and extended surface area or between nadir planar area and extended surface area) which are continuous single or multiple substantially straight line segments.

Figure 6:
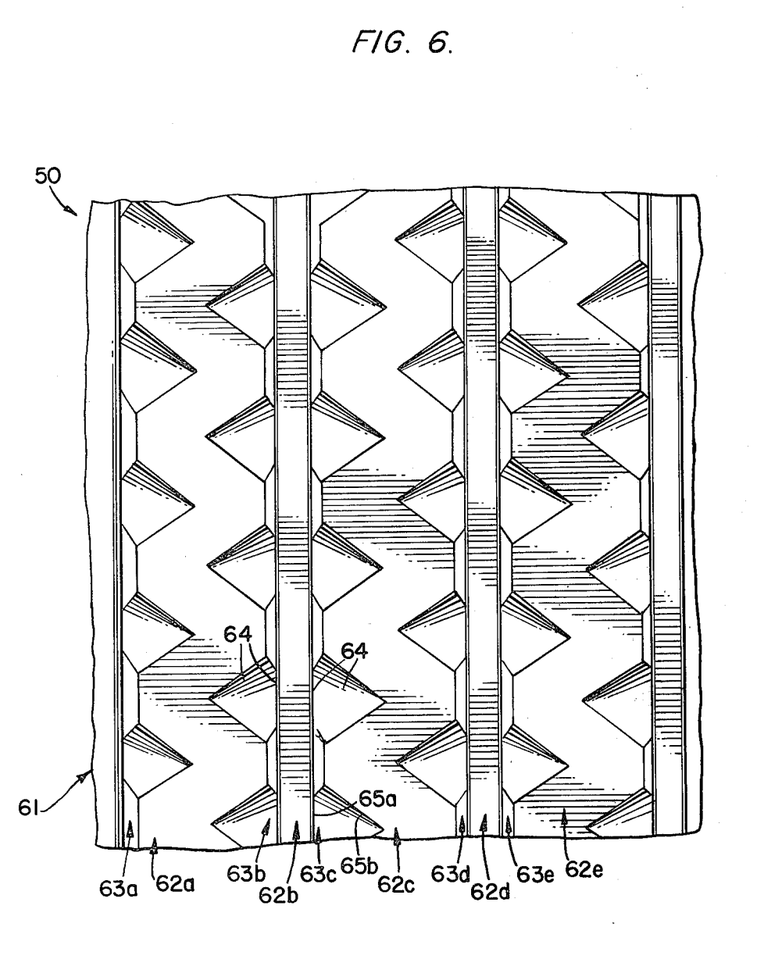
FIG. 6 is a planar view of a portion of a second major face of the sheet product of FIG. 5.

FIG. 6 is a planar view of the other major face 61 of sheet 50. Sheet 50 is formed from a sheet material of substantially uniform body thickness and, therefore, major face 61 has the reverse configuration of major face 51 of the sheet product 50. Face 61 has apex portions 62 individually labeled 62a, 62b, 62c, 62d and 62e and nadir portions 63 which are individually labeled 63a, 63b, 63c, 63d and 63e and extended surface areas 64 which extended from each apex portion 62 to an adjacent nadir portion. Each channel is defined by at least one straight line segmented continuous intersect contour line. For example, the channel formed by nadir portion 63c and its adjacent extended surface areas 64 is defined by intersect contour lines 65a and 65b which are the continuous intersect contour lines formed by surface areas 64 and apex portions 62b and 62c, respectively. Intersect contour line 65a is a substantially single straight line segment, while intersect contour line 65b is a multiple segmented straight line contour line. All portions of each contour line are capable of being at acute angles of up to 70 degrees from a vertical orientation when in a battery in normal use position.

The angle theta ($\phi$) is the acute angle formed between an imaginary vertical line and the intersect contour lines at any point thereon. The sheet products of the present invention should have open continuous channels. Such design should have lateral extensions which extend beyond any minimum lateral extension with respect to the channel's medium line. Further the design must provide an acute angle theta of up to 70 degrees at substantially all points on any of each channel's intersect contour lines between apex or nadir planar portions and extended surface area adjacent thereto.

The imaginary vertical lines can be substantially parallel to an imaginary median line of one or more channels of a sheet product or can be at an angle thereto provided that the sheets use orientation permits the fulfillment of the channels' angular requirement as described above.

The channels of the sheet product, as described herein, in combination with each other, produce resistance to compressive forces exerted on the sheet. It is preferred that at least about 20 and preferably about 50 percent of the configuration of all the channels on any sheet laterally extend beyond the minimum lateral extension for each respective channel. Channels which, therefore, have substantially uniform lateral extension may be disposed between channels having more than one lateral extension. Alternatively, some or all channels may have extended segments which have a uniform lateral extension.

It can be seen that the sheet products illustrated in FIGS. 3, 4, 5 and 6 have each channel member on each of their two major surfaces of a configuration which, in addition to having the required lateral extension, which extension is greater than any minimum extension of the channel, provides for essentially all of each channel's surfaces to be (a) open, (b) of a continuous upward orientation and (c) have all channel defining intersect contour lines at an acute angle of up to 70 degrees relative to an imaginary vertical orientation line from bottom to top of a battery in which the sheet product is contained.

Figure 7:
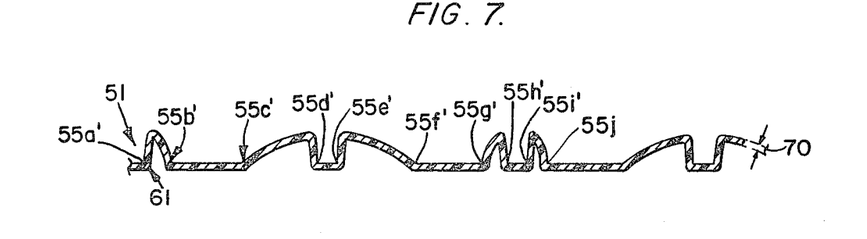
FIG. 7, is a cross-sectional view of a portion of the sheet product of FIG. 5 along line 7—7.

FIG. 7 is a cross-sectional view of the sheet product of FIG. 5 along line 7—7. Sheet product 50 has a first major face 51 and a second major face 61 which defines a substantially uniform body thickness 70. It is understood that the thickness 70 can have some variation over sheet expanse. Such variation may be due to the processing of the starting material into the subject sheet product. The cross-sectional configuration can be continuously curvilinear. The nadir planar portion of each open channel connects to adjacent extended surface area at points 55a', 55b', 55c', 55d', 55e', 55f', 55g', 55h', 55i' and 55j'. It is readily seen that any one channel on one surface forms a separation between adjacent channels on the other surface of the subject sheet product.

It is realized that the channels formed on each face of a sheet product of the present invention can be of different cross-sectional configuration. Further, the facial configuration of each channel of a sheet product of the present invention can be different from the configuration of an adjacent channel. The channels can be each of substantially the same configuration as adjacent channels, and the channels can be in nested form.

It is to be also understood that any one channel of one face of the sheet product may have a configuration wherein its lateral extension of at least one surface forming the channel is of a substantially equal amount with respect to the channel's imaginary median line for some distance along the channel. However, such channels of equal lateral extension shall not form a part of the subject sheet product to a degree which would show any substantial decrease in compressive force resistance. The exact degree of channel or channel segment of equal lateral displacement permitted depends on the particular configuration of the remaining and, particularly, the adjacent channels, as well as the particular composition of the sheet product to produce non-collapsing compressive force resistance as can be determined by those skilled in this art. It is preferred that the sheet product forming a battery separator should have less than about 50 percent of all channels or channel segments of equal lateral displacement configuration.

The sheet products of the present invention are all formed from a porous sheet material of a substantially uniform thickness of from about 0.025 mm to about 1 mm, and preferably from about 0.1 mm to about 1 mm. The desired sheet product can be formed by embossing, pressing or the like conventional processing techniques of a material that has a substantially uniform body thickness (providing for stretching and the like during formation). The maximum spacial thickness of the formed sheet product can range from about 0.25 mm to about 5 mm. although greater or lesser maximum spacial thickness may be formed for particular applications.

The sheet material used to form the present invention must be formed of an acid-stable composition. The composition preferably comprises a thermoplastic polymer and an acid resistant inorganic filler. The preferred compositions include from about 20 to about 75 percent and preferably from about 30 to about 60 percent by weight of a thermoplastic polymer and from about 25 to 80 percent and preferably from about 30 to 75 percent by weight of an acid resistant inorganic filler. The preferred thermoplastic polymer is a resin containing at least one resin selected from a polymer or copolymer of ethylene, propylene, butylene, vinyl chloride or styrene. The more preferred polymer would contain at least 50 percent ethylene units. The preferred composition may contain additional materials such as platicizer, oil, stabilizers, wetting agents and the like.

The sheet material used to form the present invention can also be formed from thermoset resinous compositions. The composition must be formed into the proper configuration prior to or while being subjected to sufficient elevated temperature conditions to cause curing of the resinous material. Thermoset compositions capable of forming the present sheet product include compositions containing thermoset resins as, for example, phenolics, EPDM (ethylene/propylene/diene), sulfur cured isoprene, butadiene, styrene and the like, as well as those described in U.S. Pat. No. 3,551,362.

The sheet material used to form the product of the present invention should be porous, that is to say have an open pore structure. The pores should be generally between about 0.01 and about 40 microns in diameter. The sheet product must be formed in a manner which does not fuse or close the structure of the pores. The complete collapse of the pores or even the collapse or closure of the pore structure at the surface of the formed sheet product would yield a sheet product, which, when used as a battery separator, would exhibit increased electrical resistance characteristics. It is understood that some reduction in pores' aggregate size may occur during processing and formation of the present sheet product. Such reduction can be tolerated.

Figure 8:
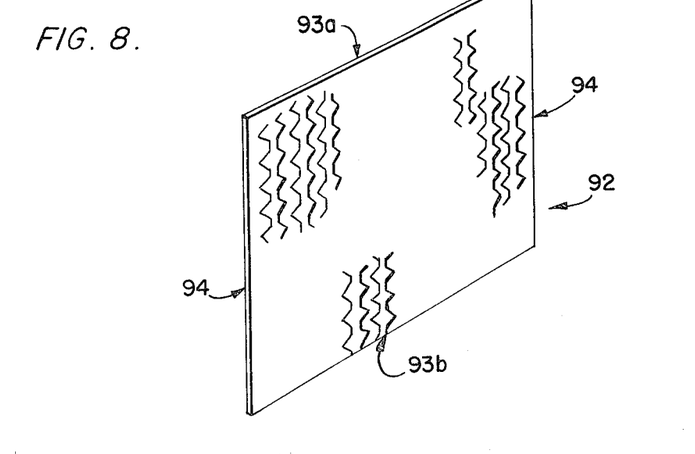
FIG. 8 is a perspective view of a single separator sheet element of the present invention.

The subject sheet products of the instant invention have been found to provide an improved battery separator, particularly for use in an acid battery system. One preferred embodiment of the separator is that it be in the form of individual sheets. Each sheet has boundary edges which define dimensions of the major surfaces of the sheet product such that the dimensions are at least substantially equal to the electrode plates between which it is contemplated that the sheet product is to be positioned. Referring to FIG. 8, sheet 92 has a substantially rectangular facial configuration bound by top edge 93a, bottom edge 93b and side edges 94. The terms "top", "bottom" and "side" refer to orientation with respect to a battery in which the sheet product is used as a separator. The top edge 93a is contemplated to be the edge of the separator in closest spacial relationship to the top of the battery when it is in its normal use orientation. Similarly, bottom edge 93b is the edge contemplated to be in closest spacial relationship with the bottom of the battery when it is in its normal use orientation. The separator should be formed from a sheet product described hereinabove such that each channel on both major faces of the separator are open, continuous channels which have their surface areas continuously open or directed upwardly in its use orientation.

The configuration requirements of the subject separator not only provide the desired properties discussed above but also provide a sheet product which can interchange its top edge 93a with its bottom edge 93b when placed between plates of opposite polarity without sacrificing any of the desired properties. This further provides one with the ability to form a separator of a wrap around or U configuration from a single piece of a sheet product of the present invention. FIG. 9 illustrates a separator 95 wrapped around an electrode plate 96 in a U configuration. The separator 95 is formed by forming a fold from a point 97 on one side edge to a point 98 on the opposite side edge, wherein points 97 and 98 are approximately equidistant from one top edge 99 of the separator. The side edges on each side of the separator which are contiguous with other portions of the same side edge can be sealed together to form sealed edges 100 and 100', such as by conventional heat sealing or ultrasonic welding of thermoplastic sheet product. Such "pocket" design further eliminates battery failure problems caused by contact of plates of opposite polarity via precipitate or scale material (conventionally known as "shed" or "mud" material) which has accumulated at the bottom of the battery container.

The sheet product of the present invention can be readily formed into a separator providing good electrolyte/electrode contact; improved gas egress means; good resistance to deformation by compressive forces; and can further facilitate formation of a battery due to its ability to be reverse oriented from top to bottom when placed in use position, or can facilitate forming a still further improved battery by its ability to be formed into a U configuration capable of inhibiting contact of plates of opposite polarity via shedded active material and the like accumulation.

Figure 10:
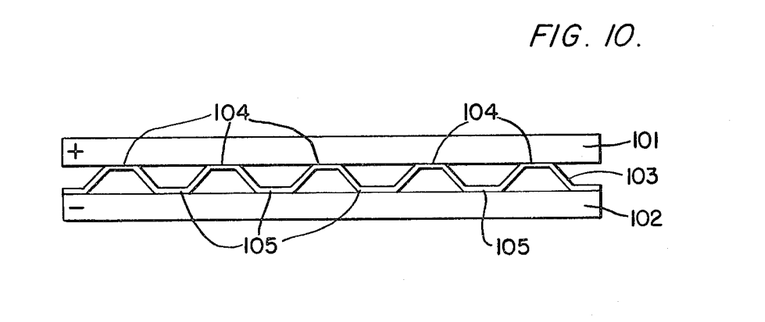
FIG. 10 is a cross-sectional view of a portion of a separator of the present invention engaged between electrode plates of opposite polarity.

FIG. 10 shows a cross-sectional view of a pair of electrode plates of opposite polarity with a separator membrane positioned there between as in an operating battery. The positive plate 101 and negative plate 102 are contiguous with the imaginary boundary facial planes of the separator such that the surface areas separating each of the adjacent channels on each of the faces are in substantial contact with the electrode plate adjacent to that face. It is preferred that the separator be oriented to provide surface areas of reduced porosity 104 (due to compression and the like forces during formation) orientated toward or in contact with the positive electrode plate 101 while surface areas of greater porosity 105 are orientated toward or in contact with the negative electrode plate 102. However, the battery separator's performance is almost equal when the battery separator's surface areas in contact with each plate member are reversed such that surface areas 104 engage the negative plate 102 and surface areas 105 engage the positive plate 101.

Each of the apex portions separating adjacent channels on any one surface of a sheet product of the present invention is substantially contiguous with a boundary facial plane of the sheet product. It is preferred that each apex portion separating adjacent channels on any one face of a sheet is at least about 75 percent, or preferably about 90 percent, and still more preferred substantially 100 percent, continuous and contiguous with its boundary facial plane from the bottom to the top of the battery separator face. Each continuous apex surface portion should be completely isolated from other apex surface portions on the same face of the sheet product. Adjacent apex surface portions on a face of the sheet product can have a spacial relationship of equal distance (such as formed by the nested configuration of sheet product of FIG. 4) or of varied distances (such as formed by an unnested configuration) from one apex surface portion to the next over the total extension of each apex surface portion. The apex surface area on any one battery plate should not exceed about 50 percent, and preferably about 30 percent, of the total surface area of the major face adjacent to the plate. Further, the spacial distance between adjacent apex surface areas may be such as to provide at least two open continuous channels per 25 mm although less channels may be suitable formed by certain configuration and still retain the desired properties.

While the invention has been described in connection with certain preferred embodiments, it is not intended to limit the invention to the particular forms set forth, but, on the contrary, it is intended to cover such alternatives, modifications and equivalents as defined by the appended claims.

What is claimed is:

1. A sheet product suitable for use as a separator in an acid battery comprising an acid-stable porous sheet material, said sheet material having first and second faces formed within spaced planes containing said faces and into a plurality of separate continuous open channels on each of said faces, each channel having a nadir substantially planar area or separated from at least one adjacent channel by an apex substantially planar area or both, each channel on each face defining a separation between two channels on the other face, each of said channels defining an imaginary median line, at least some portions of at least some of said channels extending laterally with respect to said median line such that the overall channel configuration of said sheet has at least about 20 percent extending laterally beyond the minimum lateral extension for each channel, and said channels being so configured that each of said channels is defined by at least one continuous intersect contour line; substantially all portions of said at least one intersect contour line is formed from straight line segments orientated at an acute angle theta no greater than 70° with respect to an imaginary vertical line orientated from bottom to top of a battery containing at least one separator formed from said sheet product.

2. The sheet product of claim 1 wherein the spaced planes defining said sheet product are spaced substantially parallel planes and the lateral extension beyond the minimum lateral extension is at least 50 percent based on the overall channel configuration of said sheet.

3. The sheet product of claim 1 wherein every portion of each of said intersect contour lines is oriented at an angle theta of no greater than 50 degrees.

4. The sheet product of claim 1 wherein at least some of said channels are defined by intersect contour lines; each of said lines is formed from at least one continuous straight line segment oriented at an angle theta of zero degrees and additional straight line segments oriented at an angle theta of substantially a single value greater than zero degrees.

5. The sheet product of claim 4 wherein at least some portion of some of said nadir planar areas or apex planar areas are generally of a sinusoidal configuration when viewed on either of said first face or of said second face.

6. The sheet product of claim 1 wherein some of said nadir planar areas of said channels on one face of said sheet material is substantially similar to the other in general configuration.

7. The sheet product of claim 1 wherein said sheet product is comprised of from about 20 to about 75 weight percent of a thermoplastic resin, and from about 25 to about 80 weight percent of an acid resistant inorganic filler.

8. The sheet product of claim 1 wherein the maximum thickness of said sheet is from about 0.025 mm to about 1 mm, the maximum spacial thickness is from about 0.25 mm to about 5 mm and said sheet has at least two channels on each of said faces per 25 mm horizontal dimension of each sheet.

9. The sheet product of claim 1 wherein the imaginary median line is a substantially straight line.

10. The sheet product of claim 8 wherein said resin contains at least one resin selected from the group consisting of polymers and copolymers of ethylene, propylene, butylene, vinyl chloride and styrene.

11. A battery separator suitable for use between adjacent electrode plates of opposite polarity contained in an acid battery, said separator formed from the sheet product of claims 1, 2, 3, 4, 5, 6, 7, 8, 9, or 10, and having dimensions which are at least coextensive with the dimension of the pair of electrode plates between which it is to be positioned.

12. The battery separator of claim 11 wherein the sheet product is of a substantially planar configuration.

13. The battery separator of claim 11 wherein the sheet product is of a substantially U shape configuration.

14. A battery comprising a container, an acidic electrolyte, at least one pair of electrode plates of negative/positive opposite polarity and a sheet product positioned between adjacent electrode plates of opposite polarity, wherein said sheet product is a separator of claim 11.

15. The battery of claim 14 wherein each separator is of a U shape configuration wrapped around each electrode plate of the same polarity.

16. The battery of claim 14 wherein each separator is positioned between adjacent electrode plates of opposite polarity such that an equal or greater amount of separator sheet product is in contact with the electrode plate of negative polarity.

* * * * *